3,466,260
POLYCARBONATES OF 1,4-BIS(p-HYDROXY-
CUMYL) BENZENE
Logan C. Bostian, Richmond, Va., and Thomas M. Cawthon, Dover, and Bryce C. Oxenrider, Florham Park, N.J., assignors to Allied Chemical Corporation, New York, N.Y., a corporation of New York
No Drawing. Continuation-in-part of application Ser. No. 200,037, June 5, 1962. This application July 8, 1965, Ser. No. 470,578
Int. Cl. C08g 17/13
U.S. Cl. 260—47                     4 Claims

ABSTRACT OF THE DISCLOSURE

This invention relates to the preparation of novel polycarbonates by the phosgenation of 1,4-bis(p-hydroxycumyl) benzene.

---

This application is a continuation-in-part of copending application Ser. No. 200,037 filed June 5, 1962.

Polycarbonates are among the newest and most versatile of modern plastics. Their commercial success has been due to their outstanding chemical and mechanical properties which render them useful as surface coatings, industrial castings, durable laminates, fibers and the like. In particular, polycarbonates are inherently non-corrosive, transparent, machinable, colorable, self-extinguishing, stain-resistant and possess low and high temperature strength and low mold shrinkage.

The polycarbonates of this invention are composed of recurring units of the formula

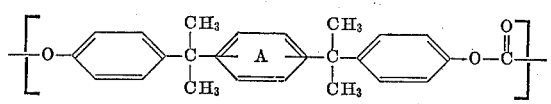

and generally possesses a molecular weight in the order of about 500 to about 200,000. These polycarbonates may be prepared by reacting 1,3-bis(p-hydroxycumyl)benzene or 1,4-bis(p-hydroxycumyl)benzene with phosgene in a basic medium. Substituents on benzene ring A may be at the 1 and 3 or 1 and 4 carbons; that is, at non-adjacent carbon atoms.

Copending application Ser. No. 140,221 of Broderick et al., filed Sept. 25, 1961, now U.S. Patent No. 3,393,244, granted July 16, 1968, discloses and claims the starting materials 1,3-bis(p-hydroxycumyl)benzene and 1,4-bis(p-hydroxycumyl)benzene and a process for the preparation thereof. Said bis(p-hydroxycumyl)benzenes are hereinafter referred to as BHCB's.

The polycarbonates of this invention may be prepared by solution polymerization wherein a BHCB is reacted with phosgene in a substantially anhydrous basic medium in the presence of an inert organic solvent for the resulting polycarbonate. Alternatively, the polycarbonates may be prepared by emulsion polymerization wherein a BHCB is phosgenated in an aqueous basic medium in the presence of an inert organic solvent for the resulting polycarbonate.

The ratio of phosgene to a BHCB is not critical. Generally, at least 0.1 mol of phosgene per mol of BHCB is employed. Theoretically, an equimolar amount of phosgene to BHCB is required for complete conversion to polycarbonate; however, to compensate for loss of phosgene by side reactions, slightly more than 1 mol of phosgene per mol of BHCB is normally used. Accordingly, about 1.1 to 1.7 mols of phosgene per mol of 1,4-bis(p-hydroxycumyl)benzene are preferably employed. If less than 1 mol of phosgene per mol of BHCB is used, correspondingly less of the BHCB will be converted to polycarbonate.

Use of more than the preferred amount of phosgene tends to promote side reactions which decrease process efficiency and produce polycarbonate of lower quality.

In solution polymerization, the substantially anhydrous basic medium preferably comprises a tertiary amine, such as tributylamine, triethylamine, pyridine or $\alpha$-picoline. In emulsion polymerization, the aqueous basic medium preferably comprises an aqueous solution of an alkali metal hydroxide, such as sodium potassium or lithium hydroxide. A slight excess of the basic material is desirably employed in either case.

The polycarbonate should be soluble in the organic solvent which is employed, and the solvent should be substantially inert under the conditions of the reaction and have a sufficiently high boiling point to allow for reaction at elevated temperatures, if desired. The amount of the solvent is not critical, but from about 1 to 20 parts by weight per part of polycarbonate formed are usually employed. Emulsion polymerization necessitates the use of a water-immiscible solvent such as methylene chloride or ethylene chloride. In the case of solution polymerization, a water-miscible solvent such as 1,4-dioxane or tetrahydrofuran may be utilized; however, it is preferred to employ a water-immiscible solvent such as those recited for emulsion polymerization.

If no organic solvent is employed in the process, only low molecular weight polycarbonate is produced which precipitates from solution substantially as it is formed.

In the emulsion polymerization system using 1,4-BHCB the concentration of the aqueous alkali metal hydroxide solution is critical. Thus, when the solution contains in excess of 3 percent by weight of alkali metal hydroxide (in which the 1,4-BHCB is substantially insoluble), an inert, water-miscible organic co-solvent for the polycarbonate, such as 1,4-dioxane or tetrahydrofuran, must be added to the reaction mixture. This co-solvent is partitioned between the aqueous and organic phases and sufficiently solubilizes the 1,4-BHCB to permit polymerization. It is generally employed in amount ranging from about 0.5 to 5 parts by weight per part of the polycarbonate formed. On the other hand, when the solution contains not more than about 3 percent by weight of alkali metal hydroxide, the need for such co-solvent is eliminated.

1,3-BHCB is far more soluble in aqueous alkali metal hydroxide solutions than 1,4-BHCB which enables use of alkali metal hydroxide solutions in higher concentration without the addition of other solubilizing agents. In preferred emulsion polymerization using 1,3-BHCB, from about 0.1 to about 8 percent by weight alkali metal hydroxide solution is employed, particularly outstanding results being obtained with solution having a concentration of about 2 to about 6 percent by weight.

In order to provide a means for regulating exothermic heat of reaction, the phosgene is preferably slowly introduced into the basic solution, with the preferred time of addition being about 15 minutes to about 4 hours. Slow addition of the phosgene not only enables more accurate control of the reaction temperature but may also serve to obviate the necessity for use of heat-dissipating equipment.

The temperature of the reaction may vary within a wide range, that is, it may be carried out at room temperature or lower or higher temperatures, as desired. It is preferred, however, that temperatures ranging from about 0° to 100° C. be maintained thoughout the reaction. In use of the preferred reaction temperatures, maximum conversions are obtained when the reaction is carried out over a period of about 1 to 5 hours.

The phosgenation ordinarily produces a polycarbonate of low molecular weight. This polycarbonate can be converted into one of high molecular weight by a postphosgenation growth period involving prolonged heating and stirring.

In the emulsion polymerization system, rapid growth to high molecular weight polycarbonate is realized by introducing a suitable catalyst. The catalyst may comprise a quaternary ammonium compound, such as benzyltriethylammonium chloride, or a quaternary phosphonium or arsonium compound, such as tetrabutylphosphonium bromide or tetraphenylarsonium iodide. Addition of the catalyst may be made prior to phosgenation of the reaction mixture, or, if desired, phosgenation may be carried out first, and the catalyst then added. The catalyst is preferably employed in amount from about 0.001 to 5.0 percent by weight based on the BHCB starting material.

Upon completion of the reaction, the reaction mixture containing the polymer in solution is washed with an aqueous solution of a mineral acid, such as hydrochloric acid. The acid-treated solution is then washed with water until the pH of the wash water is about 7. The polycarbonate may then be recovered from solution by conventional means, such as evaporation or distillation of the solvent or precipitating the polycarbonate by addition of a non-solvent, such as methanol, isopropanol, heptane, isooctane, etc. Of course, in the emulsion polymerization system the solvent phase is separated prior to recovery of the polycarbonate. If desired, the polycarbonate may be further purified by reprecipitation from a suitable solvent, such as ethylene chloride or methylene chloride.

Conventional chain terminators may be employed in order to control molecular weight. Typical examples of terminators are phenol, p-cumyl phenol, chlorophenol, nonyl alcohol, butyl alcohol, etc. Discontinuance of molecular growth of a BHCB polycarbonate is effectively accomplished when the chain terminator is introduced during the postphosgenation period. This enables obtainment of a polycarbonate of reproducible molecular weight.

Various additives may be employed, such as antioxidants, additives to prevent the decomposition of phosgene and additives to preferentially react with phosgene decomposition products. Typical of such additives are sodium dithionite, potassium bisulfite, carbon monoxide, etc.

It has been found that if the reaction proceeds under atmospheric conditions using either solution or emulsion polymerization procedure, some oxidation of the BHCB may occur which results in lowered yield and excessive discoloration of the polycarbonate. In order to minimize or completely eliminate these negative factors, the reaction should be carried out under an inert atmosphere which may be readily provided by blanketing the reaction system with an inert gas, such as nitrogen, argon, carbon monoxide, etc.

The following examples are given for the purposes of illustrating the present invention. In the examples, parts are by weight.

EXAMPLE 1

A solution was prepared by dissolving 34.6 parts of 1,4-BHCB in 503 parts of ethylene chloride and 77.8 parts of tributylamine. An inert atmosphere was provided by maintaining a slow stream of nitrogen over the reaction system. 14.85 parts of phosgene were slowly added to the solution over a three-hour period at temperature of 30°. The reaction mixture was allowed to stand for an extended period at room temperature, whereupon it was washed with a dilute aqueous solution of hydrochloric acid and the water until wash water of a pH 7 was obtained. The resulting 1,4-BHCB polycarbonate was then precipitated by slowly adding the reaction mixture to 750 parts of rapidly agitated methanol. The precipitated polycarbonate was dried at temperature of 70° C. and under vacuum (about 150 mm. Hg). 50.7 parts of polycarbonate were obtained.

A portion of the polycarbonate was dissolved in ethylene chloride and fractionated by increment addition of methanol. About 40 percent of the polycarbonate precipitated as the first fraction. After drying, this polycarbonate possessed an inherent viscosity of 0.43 (corresponding to a molecular weight of about 15,000) and a flow point of 200° to 215° C. A tough, flexible film was prepared from the polycarbonate by pressing it between platens of a Carver Press.

EXAMPLE 2

34.6 parts of 1,4-BHCB were slurried in a dispersion of 100 parts of 1,4-dioxane, 377 parts of ethylene chloride and 300 parts of water containing 10.8 parts of sodium hydroxide, while maintaining a nitrogen atmosphere over the reaction system. The slurry was heated for a period of 25 minutes at temperature of 30° C. 9.5 parts phosgene were slowly added to the slurry over a period of 33 minutes, while maintaining reaction temperature at 30° C. 0.9 part triethylbenzylammonium chloride in the form of a 10 percent by weight aqueous solution was then added to the reaction mixture in order to facilitate molecular growth, and the phosgenation was continued. A total of 7 parts of phosgene were added over a period of 20 minutes. Throughout the entire reaction, a pH of 11 was maintained by adding a 5 percent aqueous solution of sodium hydroxide. The organic phase was separated and was washed with a dilute aqueous hydrochloric acid solution and water as in Example 1. The resulting polycarbonate was finally isolated by slowly adding the organic phase to 1000 parts of rapidly agitated acetone, followed by filtration and drying procedure at temperature of 80° C. under vacuum. 21.4 parts of 1,4-BHCB polycarbonate having an inherent viscosity of 0.88 (corresponding to a molecular weight of about 40,000) were recovered.

EXAMPLE 3

34.6 parts of 1,4-BHCB were slurried in a dispersion of 377 parts of ethylene chloride and 400 parts of water containing 10 parts of sodium hydroxide, while maintaining a nitrogen atmosphere over the reaction system. While maintaining the reaction system at temperature of 30° C., 13.5 parts phosgene were slowly added over a 37-minute period until the pH of the system decreased to 7. 0.28 part of p-cumylphenol and 0.18 part of benzyltriethylammonium chloride were then added to the reaction mixture, and the mixture was stirred for 1½ hours, while adding 1 normal aqueous sodium hydroxide solution, as needed, to maintain a pH of 11. The organic phase was separated, washed with dilute hydrochloric acid and then successive portions of water until the wash water had a pH of about 7. The polycarbonate was precipitated by addition of the washed polymer solution to 1000 parts of rapidly agitated acetone. 33 parts of 1,4-BHCB polycarbonate possessing an inherent viscosity of 0.70 (corresponding to a molecular weight of about 30,000) and a flow point of 240° to 250° C. were recovered.

The infrared spectra of the 1,4-BHCB polycarbonate showed strong absorption bands at the following wave lengths: 5.65, 6.65, 8.05, 8.38, 8.60, 9.85 and 12.02 microns. These spectra are in agreement with that which would be expected from theoretical considerations of the molecule.

The physical and mechanical properties of 1,4-BHCB polycarbonate having an inherent viscosity of 0.61 (corresponding to a molecular weight of about 25,000) are set forth in the following Table I. All testing procedures employed are those of the American Society for Testing Materials.

TABLE I.—PHYSICAL AND MECHANICAL PROPERTIES OF 1,4-BIS(p-HYDROXYCUMYL) BENZENE POLYCARBONATE

| Property | ASTM method | Value |
|---|---|---|
| Specific gravity, 23° C. | D792 | 1.1414 |
| Glass transition temp., ° C. | D1043 | 154 |
| Elastic modulus, p.s.i. | D747 | 480,000 |
| Compressive strength, p.s.i. | D695 | 11,500 |
| Flexural strength, p.s.i. | D790 | 15,000 |
| Heat distortion, ° C. | D648 | 152 |
| Rockwell hardness, R scale | D785 | 117 |
| Water absorption, percent 24 hrs. | D570 | 0.14 |

EXAMPLE 4

A dispersion was prepared consisting of an aqueous portion containing 32 parts of 1,3-BHCB, 9 parts of sodium hydroxide and 300 parts of water, and a solvent portion consisting of 377 parts of ethylene dichloride. 0.26 part of benzyltriethylammonium chloride as a 10 percent by weight aqueous solution was then added. A nitrogen atmosphere was maintained over the reaction system. While maintaining the system at temperature of 30° to 35° C., 10 parts of phosgene were slowly added over a period of about 30 minutes until the pH of the reaction mixture decreased to 7. The resulting viscous emulsion was broken by the addition of acetone, and the aqueous layer was separated and discarded. The remaining organic layer was washed with a dilute solution of hydrochloric acid, followed by 4 successive washings with 500 parts of water until the wash water had a pH of about 7. The neutralized organic layer was then added to rapidly agitated heptane, whereupon 1,3-BHCB polycarbonate precipitated out as a rubbery mass. The resulting mass was washed by kneading with water and vacuum dried for about 12 hours at temperature of 70° C. and 150 mm. Hg. The 1,3-BHCB polycarbonate was then ground to a 20 mesh powder and redried. 22.7 parts of 1,3-BHCB polycarbonate having a flow point of 165° to 185° C. and an inherent viscosity of 0.65 were obtained.

EXAMPLE 5

A dispersion was prepared consisting of an aqueous phase containing 48 parts of 1,3-BHCB and 13.5 parts of sodium hydroxide in 450 parts of water and a solvent portion consisting of 567 parts ethylene dichloride. 0.35 part of benzyltriethylammonium chloride as a 10 percent by weight aqueous solution was then added. An atmosphere of nitrogen was maintained over the reaction mixture. After stirring for ten minutes an emulsion was obtained. 15 to 16 parts of phosgene were then slowly introduced over a period of 115 minutes until the pH of the system decreased to 7. The initial reaction temperature was 24° C. which was increased to 30° C. after 48 minutes. The resulting reaction mixture was a highly viscous, stable emulsion at a pH of 11 after a period of 65 minutes. Continued addition of phosgene until the reaction mixture possessed a pH of 8 to 9 produced a less stable emulsion. After phosgenation was completed, the mixture separated in a short time into a clear aqueous layer and a hazy organic layer. The organic layer was separated and washed with a dilute solution of hydrochloric acid, followed by 10 successive washes with 400 parts of deionized water. The solution of 1,3-BHCB polycarbonate in ethylene chloride thus obtained was allowed to stand to permit residual water to be removed. Aliquots of the polycarbonate solution were treated as follows:

(a) To about 13 parts of the stirred polycarbonate solution were added dropwise about 32 parts of acetone which precipitated out the 1,3-BHCB polycarbonate in stringy form. This polycarbonate, which coalesced into a dough, was broken into pieces and vacuum dried at temperature of 80° C. and 18 inches Hg. 0.6 part of 1,3-BHCB polycarbonate having a flow point of 168° to 175° C. and an inherent viscosity of 0.797 was obtained. A clear and tough film was prepared by pressing at temperature of 185° C.

(b) Three additional 13 part portions of polycarbonate solution were each treated with 23 parts of butyl ether, 22 parts of isopropyl ether and 21 parts heptane. The precipitated 1,3-BHCB was recovered and treated in the same manner described in (a). From each portion was obtained 0.8 part of 1,3-BHCB polycarbonate having a flow point of 162° to 172° C. and inherent viscosites of 0.827, 0.810 and 0.784.

(c) 8 parts of acetone were added dropwise to 13 parts of stirred polycarbonate solution. To the resulting clear reaction mixture were then added dropwise about 15 parts of butyl ether giving a slightly opaque solution which was allowed to evaporate to about 20 parts. 0.7 part of 1,3-BHCB polycarbonate in the form of a powder having a flow point of 165° to 175° C. and an inherent viscosity of 0.715 was obtained. A clear and tough film was prepared by pressing the polycarbonate at 185° C.

(d) 8 parts of acetone were added to 15 parts of polycarbonate solution, followed by the addition of about 14 parts of heptane. 1,3-BHCB polycarbonate appeared as a stringy precipitate which coagulated into pieces and disintegrated into a fine powder. 1.2 parts of 1,3-BHCB polycarbonate having a flow point of 162° to 172° C. were obtained. Substantially the same results were obtained when 4 parts rather than 8 parts of acetone were employed.

(e) About 84 parts of acetone were added to about 137 parts of stirred polycarbonate solution, followed by the addition of about 147 parts of heptane. 1,3-BHCB polycarbonate appeared as a stringy precipitate which coagulated into lumps and then disintegrated into a fine powder. 8.3 parts of 1,3-BHCB polycarbonate having a flow point of 165° to 170° C. and an inherent viscosity of 0.837 were obtained. A clear tough film was prepared by pressing the polycarbonate at temperature of 185° C.

(f) 4 parts of butyl ether were added to 13 parts of stirred polycarbonate solution, followed by the addition of 14 parts of heptane. The resulting stringy precipitate of 1,3-BHCB polycarbonate coagulated and disintegrated into a fine powder. 1.1 parts of 1,3-BHCB polycarbonate having a flow point of 158° to 170° C. were obtained.

EXAMPLE 6

A dispersion was prepared with 16 parts of 1,3-BHCB, 4.5 parts of sodium hydroxide, 150 parts of deionized water, 189 parts of ethylene dichloride and 1.3 parts of a 10 percent by weight aqueous solution of benzyltriethylammonium chloride under a nitrogen atmosphere. The reaction mixture was heated with stirring to temperature of 27° C., and phosgene added over a period of 46 minutes until the pH of the reaction mixture decreased to about 8 to 9. Stirring was discontinued, and 100 parts of the resulting aqueous layer were removed. 33 parts of ethylene dichloride were added to the organic layer which was then washed with 150 parts of warm water with agitation for a period of 2 minutes. The aqueous layer having a pH of 8 and comprising 170 parts was then removed. Two additional washings of the organic layer with 150 parts of warm water were made, followed by washing with 150 parts of a dilute aqueous solution of hydrochloric acid. 33 parts of ethylene dichloride were then added to effect separation, followed by three additional washings with 150 parts of water until the wash water possessed a pH of 6. An emulsion resulted which was allowed to stand overnight and separated into two clear phases. The aqueous phase was removed, and the remaining layer comprising ethylene dichloride solution containing 1,3-BHCB polycarbonate was treated as follows:

(a) 1,3-BHCB polycarbonate was precipitated by slowly adding 26 parts of polycarbonate solution to a stirred mixture of 36 parts of isopropyl ether and 40 parts of acetone. 1.2 parts of powdered 1,3-BHCB polycarbonate having a melting point of 160° to 167° C. and an inherent viscosity of 0.743 were obtained. A clear tough film was prepared from the polycarbonate by pressing at 180° C.

(b) 26 parts of polycarbonate solution were added with stirring to a mixture of 40 parts of acetone and 35 parts of heptane. The resulting 1,3-BHCB polycarbonate precipitated out of solution as a gum which crystallized and disintegrated to a fine powder. 1.2 parts of 1,3-BHCB polycarbonate having a melting point of 160° to 167° C. were obtained.

(c) 13 parts of polycarbonate solution were added to 31 parts of butyl ether. 1,3-BHCB polycarbonate precipitated out of solution as a gum but upon continued stirring formed a fine powder. 0.8 part of 1,3-BHCB polycarbonate having a flow point of 155° to 165° C. and an inherent viscosity of 0.673 was obtained. A clear tough film was prepared by pressing the polycarbonate. The film possessed a glass transition temperature of 90° to 96° C., as shown by the relaxation of stress birefringence under crossed Nicols.

The 1,3-BHCB polycarbonate obtained from Example 5 and other similar runs were combined. The combined product exhibited physical properties which are tabulated in Table II given below.

TABLE II

| | Method ASTM test No. |
|---|---|
| Inherent viscosity, 0.78 | ----- |
| Specific gravity, 23/23° C., 1.147 | D792 |
| Glass transition temperature, ° C., 94 | D1043 |
| Melting point, ° C., 153–156 | ----- |
| Tensile strength, p.s.i. (21±.5° C., 2" min.), 9,100 | D638 |
| Yield strength, p.s.i. (21±.5° C., 2" min.), 9,100 | D638 |
| Flow point, ° C., 160–170 | ----- |

The inherent viscosity of the 1,3-BHCB polycarbonate was determined from 0.5 percent by weight solution of the polycarbonate in ethylene dichloride at temperature of about 25° C. The melting point was determined by differential thermal analysis of the 1,3-BHCB polycarbonate in powdered form. The flow point was determined by a hot stage microscope.

The polycarbonate prepared from 1,4-BHCB possesses an extraordinary degree of pliability and elasticity, thereby dispensing with the necessity of further modification.

Use of polycarbonates for electrical coatings not only demands high heat resistance but also requires a high degree of dimensional stability. The polycarbonate prepared from 1,4-BHCB possesses the necessary heat resistance and dimensional stability and in addition, has the advantage of being transparent. Moreover, these properties render the 1,4-BHCB polycarbonate useful in the production of lenses and instrument windows where environmental or illumination heat requires high temperature stability in order to maintain visibility.

An outstanding property of the 1,4-BHCB polycarbonate is its low water absorption. This is particularly important since moisture, if absorbed by the polycarbonate, decreases its dimensional and chemical stability, thus minimizing its use in those applications which require resistance to humid environmental conditions. In this connection, the value obtained for water absorption of the 1,4-BHCB polycarbonate is less than one half of that exhibited by the commercial polycarbonate of bisphenol-A (i.e. 2,2-bis(p-hydroxyphenyl)propane).

Moreover, the tensile modulus value obtained for the 1,4-BHCB polycarbonate is almost twice as high as that possessed by the commercial bisphenol-A polycarbonate. This presents a potential advantage for the present polycarbonate in the maintenance of dimensional stability under heavy loads.

The new polycarbonate prepared from 1,3-BHCB possesses a relatively low flow point whereas, generally polycarbonates present a basic disadvantage in that they are processed with difficulty due to their unusually high flow points. Hence, the 1,3-BHCB satisfies a need in the art for polycarbonates having relatively low flow points which enable them to be readily processed without danger of discoloration or decomposition by conventional procedures, such as injection molding, extrusion, compression molding, casting, drawing and the like.

The present invention may be embodied in other forms or carried out in other ways without departing from the spirit thereof. The present embodiment is, therefore, to be considered illustrative and not restrictive.

We claim:
1. A solid thermoplastic polycarbonate composed of recurring units of the formula:

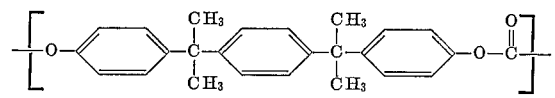

and having a molecular weight within the range of from about 500 to 200,000.

2. A dimensionally and thermally stable plastic of low water absorptiveness essentially consisting of at least one polycarbonate as defined in claim 4 and having a molecular weight between about 15,000 and about 40,000 and a flow point of at least about 200° C.

3. A plastic as defined in claim 2, said plastic being transparent and useful as a lens at elevated temperatures.

4. A plastic as defined in claim 3, said plastic having a high tensile modulus and dimensionally stable under heavy loads.

References Cited

UNITED STATES PATENTS

| 3,247,164 | 4/1966 | Caldwell | 260—47 |
| 2,970,131 | 1/1961 | Moyer et al. | 260—47 |
| 3,193,529 | 7/1965 | Oxenrider | 260—47 |
| 3,193,530 | 7/1965 | Oxenrider | 260—47 |
| 3,021,305 | 2/1962 | Goldberg | 260—47 |
| 3,227,681 | 1/1966 | Conix | 260—47 |
| 3,251,805 | 5/1966 | Schnell et al. | 260—47 |
| 3,275,601 | 9/1966 | Schnell et al. | 260—47 |

FOREIGN PATENTS

| 576,639 | 5/1959 | Canada. |
| 1,293,289 | 4/1962 | France. |
| 932,811 | 7/1963 | Great Britain. |

OTHER REFERENCES

Schnell et al. IV, Chemical Abstracts, vol. 58 (1963), col. 3525–6 (Abstract of Belgian Patent No. 614,664, granted March 30, 1962).

SAMUEL H. BLECH, Primary Examiner

U.S. Cl. X.R.

260—619

UNITED STATES PATENT OFFICE
CERTIFICATE OF CORRECTION

Patent No. 3,466,260  Dated September 9, 1969

Inventor(s) L.C. Bostian, T.M. Cawthon, and B.C. Oxenrider

It is certified that error appears in the above-identified patent and that said Letters Patent are hereby corrected as shown below:

In the claims, claim 2, line 25 "claim 4" should read --claim 1--.

SIGNED AND SEALED

DEC 9 - 1969

(SEAL)
Attest:

Edward M. Fletcher, Jr.
Attesting Officer

WILLIAM E. SCHUYLER, JR.
Commissioner of Patents